July 2, 1968 D. W. TRENT 3,391,351

CIRCUITS USING A TRANSISTOR OPERATED INTO SECOND BREAKDOWN REGION

Filed Nov. 21, 1966 3 Sheets-Sheet 1

INVENTOR
D. W. TRENT
BY Charles E. Graves
ATTORNEY

1

2

3,391,351
CIRCUITS USING A TRANSISTOR OPERATED INTO SECOND BREAKDOWN REGION

Dale W. Trent, Richardson, Tex., assignor to Bell Telephone Laboratories, Incorporated, Murray Hill, N.J., a corporation of New York Filed Nov. 21, 1966, Ser. No. 595,913
5 Claims. (Cl. 331—111)

ABSTRACT OF THE DISCLOSURE

A general concept for successful continuous operation of transistors in the mode known as "second breakdown" is disclosed. Several specific circuit embodiments are described involving oscillators variously operating into the second breakdown region. Charging circuits and component characteristics for them, principally capacitive charging, are set out. A master trigger circuit and a magnetic core driver are included in the specific examples of second breakdown applications.

This invention relates to transistor circuits and more particularly to circuits in which one or more transistors are gainfully operated in the region known as "Second Breakdown."

The term "Second Breakdown" (SB) connotes a transistor junction condition in which, as the device is swept through its $V_{ce}$ vs. $I_c$ characteristic for example, $V_{ce}$ drops abruptly and concurrently $I_c$ rises steeply. SB can be made to occur in all transistor configurations, and has substantially the same qualitative aspects and results in NPN as well as PNP type transistors.

Although the SB phenomenon has not yet been explained in terms satisfactory to all, there is agreement that in both cause and effect it is distinct from the various first breakdown modes. Avalanche breakdown, for example, is characterized in the CE configuration by a leveling out of $V_{ce}$ as $I_c$ increases, in contrast to the sharp drop in $V_{ce}$ occurring in SB.

In addition to the negative dynamic resistance exhibited in its main current-carrying junction region during SB, there occurs in the transistor a gross thermal energy dissipation which if large enough can bring on one or more of several failure modes associated with SB. Using the CE configuration again by way of example, with the reduction in $V_{ce}$ at the initiation of SB in a transistor, a large fraction of the current from the emitter to the collector converges in a very narrow channel. The heat resulting from this current constriction can cause a collector-to-emitter short, which is the characteristic catastrophic failure of SB.

Not all of the mechanisms involved in SB failures are yet understood in detail. These uncertainties and the preoccupation with the transistor's conventional and proven capabilities apparently have led circuit experimenters merely to ignore SB, or where necessary, to avoid it.

My invention, however, contemplates the purposeful and nondestructive operation of transistors in the SB region to turn to account in novel circuit applications the hitherto avoided characteristics exhibited in this region.

A primary object of the invention, accordingly, is to operate a transistor advantageously in its region of second breakdown.

An added object of the invention is to produce a new source of high current pulses.

A further object of the invention is to generate pulses with very fast rise times.

A more specific object of the invention is to produce variable high frequency oscillators using a transistor operated in its second breakdown region.

These and other objects are achieved in accordance with the invention, broadly, by limiting in unique fashion in a given circuit the energy dissipated in the transistor during the SB transient to a value below a threshold level established for that transistor.

For a given transistor driven deliberately into SB, there first occurs the mentioned initial energy dissipation $E_M$ required to initiate SB. Thereafter during the SB transient a further energy dissipation occurs. At some point unique for each transistor observed, this further energy dissipation can, as stated, be great enough to cause irreversible thermal damage to the junctions. The minimum energy dissipated during the SB transient sufficient to cause such damage is termed $E_T$ and herein called the threshold energy. $E_T$ may be ascertained empirically for each transistor. The energy actually dissipated, then, during the SB transient, herein termed $E_A$, therefore must be less than the characteristic $E_T$ to avoid the irreversible damage.

In accordance with one feature of the invention, the abrupt decrease in $V_{ce}$ is used to generate in an appropriate circuit high voltage pulses with very fast rise times. These voltage pulses can be used as clock or gate pulses for voltage sensitive logic circuitry. The repetition rate of these pulses can be controlled either for an astable operation or for a monostable operation.

A further feature of the invention is that unusually large current pulses supplied by a suitable capacitor, for example, and occurring across the transistor's emitter and collector leads during the breakdown transient can be employed to switch magnetic cores or other similar devices. The high and variable repetition rate of these pulses produced pursuant to the invention is advantageous in this application.

In one illustrative embodiment of the invention involving an oscillator circuit, a PNP transistor with the emitter-base path shorted and with a collector-to-base capacitor is driven into SB by a charging circuit including a voltage source, the capacitor and a variable resistor. When SB occurs, $V_{ce}$ drops abruptly ($dv/dt=5\times10^9$ volts/sec.) and the capacitor pulses through the emitter and base leads. The transistor turns off and the cycle repeats. Under astable operation, the circuit is a variable high frequency pulse generator with a minimum number of components. As will be described hereinafter in detail, monostable operation is also possible.

Other objects, features and advantages of the invention are readily apparent in the description to follow of several illustrative embodiments thereof and in the drawing in which.

Figure 6:
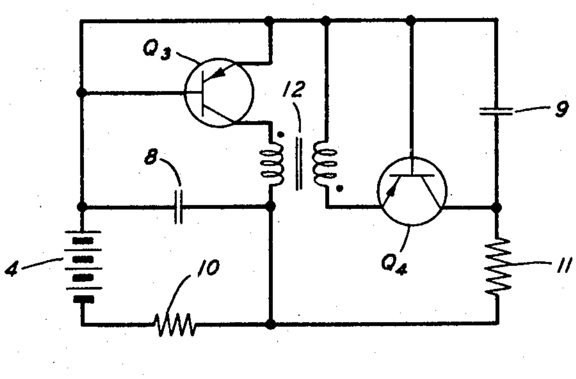

FIG. *5a* is a circuit schematic of a further embodiment of the invention;

FIG. *5b* is a circuit schematic illustrating a constant current drive for the basic invention;

FIG. 6 is a circuit schematic showing a still further embodiment of the invention;

FIG. *6a* is a graph of certain characteristics of the FIG. 6 circuit; and

Figure 7:
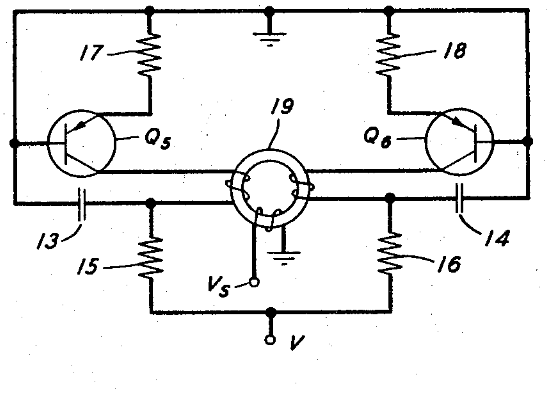
Figure 8:
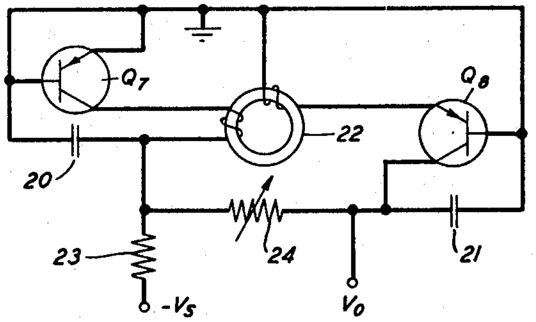

FIGS. 7 and 8 are two further applications of the invention shown in circuit schematic form.

A more specific description of the SB phenomenon may be helpful to an understanding of the invention's embodiments thereinafter delineated.

Figures 1, 3:
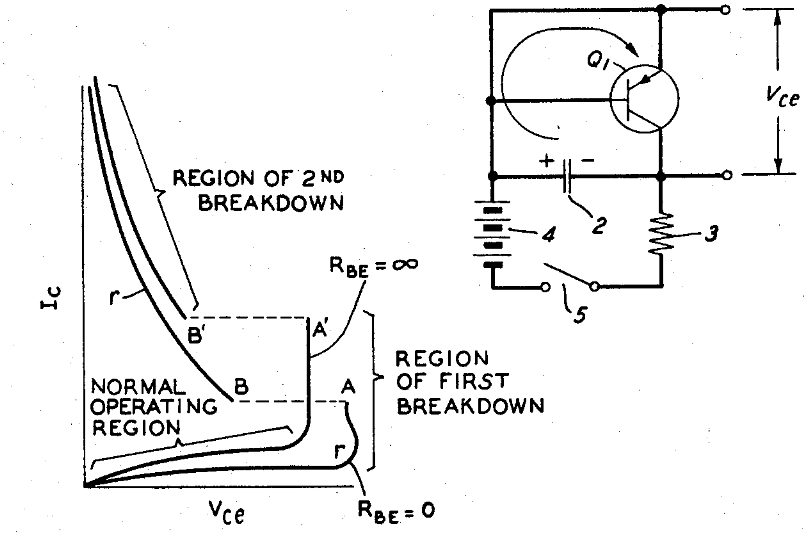
FIGS. 1 and 2 are graphs depicting aspects of the SB mode.
FIG. 3 is a circuit schematic of an illustrative circuit embodying the invention.

FIG. 1 depicts for an NPN of PNP CE-connected transistor the $V_{ce}$ vs. $I_c$ characteristics observed by earlier experimenters that lead to the concept of an energy $E_M$ necessary to initiate SB. A rectified 60 c.p.s.

signal of an amplitude sufficient to initiate SB was applied to a transistor and a series current limiting resistor. A third dimension, namely time, is represented by the length of a trace. Shown are regions of normal operation, first breakdown and second breakdown for cases where $R_{BE}=\infty$ and $R_{BE}=0$ respectively. First breakdown, although here shown for illustrative purposes, is not always a prerequisite occurrence for SB. The initiation of SB occurs after a delay time $\Delta t$ during which the energy $E_M$ is dissipated in the transistor. The effect of $E_M$ is to produce localized spots of critical temperature in the junction regions. After the transistor has entered SB, a very abrupt decrease in $V_{ce}$ is observed. As $V_{ce}$ decreases, the current through the constriction site increases as the device exhibits a negative dynamic resistance. The energy dissipation during the SB transient can be substantially in excess of $E_M$ and, if not limited pursuant to the invention, can be destructive.

Figure 2:
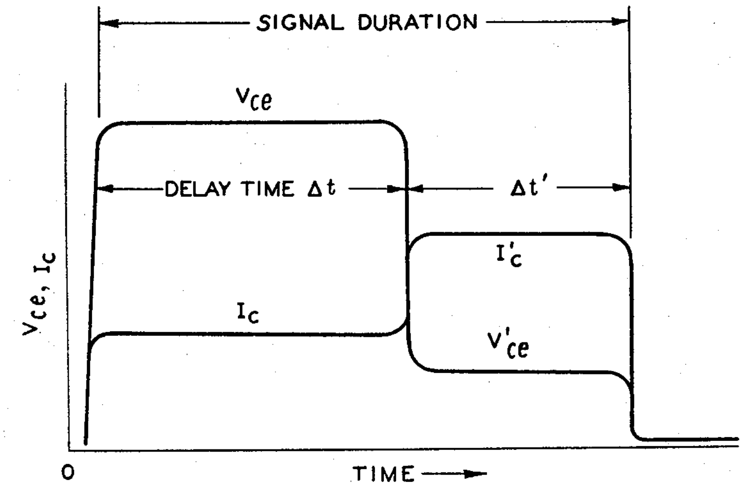

FIG. 2 is a special case of a rectangular voltage pulse applied to the transistor. Here, $V_{ce}$ and $I_c$ are constant during the delay time although normally both are functions of time. For this case, a fair approximation of $E_M$ is the product $V_{ce}I_c\Delta t$. FIG. 2 illustrates the stable state of a transistor remaining in the SB mode for a time $\Delta t'$. An energy is dissipated during $\Delta t'$ approximately equal to $V'_{ce}I'_ct'$ that corresponds to $E_A$. If $E_A<E_T$ for this transistor, the operation is reversible and can be repeated.

All transistors on which experiments were conducted, including 12H alloy germanium PNP, 40A planar silicon NPN, and 15A diffused germanium type PNP types exhibited a characteristic $E_T$.

Advantageously, the abrupt decay of $V_{ce}$ from points A to B, and from points A' to B' can be as little as 15 nanoseconds or less. For this duration, where a suitable external base-to-emitter capacitor is employed, a current pulse of the order of 20 amperes can be withstood and delivered by the transistor depending on the destruction thershold of the transistor.

Turning now to specific embodiments of the invention, there is shown in FIG. 3 an astable oscillator circuit employing a transistor Q1 having conventional base, emitter and collector electrodes. The emitter and base electrodes are shorted together. A capacitor 2 is connected directly across the base and collector electrodes. Completing the oscillator is a driving circuit consisting of capacitor 2, a resistor 3, a power source 4 and a single switch 5. A PNP transistor is shown, but an NPN can be used equally well if the voltage and current polarities are reversed.

After closure of switch 5, the transistor is initially non-conducting. The potential $V_{ce}$ increases exponentially due to the charging of capacitor 2. The rate of charge of capacitor 2 is a function of the ohmic value of resistor 3 and the leakage current of transistor Q1. When the magnitude of $V_{ce}$ and the transistor's leakage current have reached sufficient levels, an abrupt drop in $V_{ce}$ occurs and transistor Q1 enters SB, exhibiting a negative dynamic resistance. As a result, the stored charge in the base-to-collector capacitor 2 is rapidly discharged through the ON transistor in the form of a current pulse through the emitter and collector leads.

This discharge transient must not, of course, result in permanent damage to the device. Accordingly, an upper limit is placed on the size of the base-to-collector capacitor 2 such that the energy dissipated during the transient is less than $E_T$. The lower limit of the capacitor value is the internally distributed capacitance of transistor Q1.

For astable generation the maximum value of resistor 3 must be that value whose product with the leakage current of transistor Q1 results in a reduction of the magnitude of $V_{ce}$ sufficient to prevent initiation of SB. The minimum ohmic value of resistor 3 must be that value which is small enough to allow return of transistor Q1 to its off mode.

Figure 4:
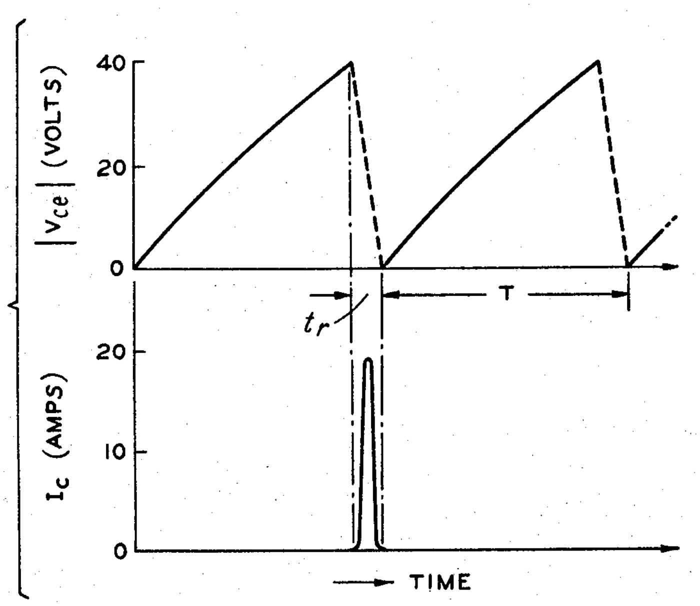
FIG. 4 is a graph of certain characteristics of the FIG. 3 circuit.
Figure 5A:
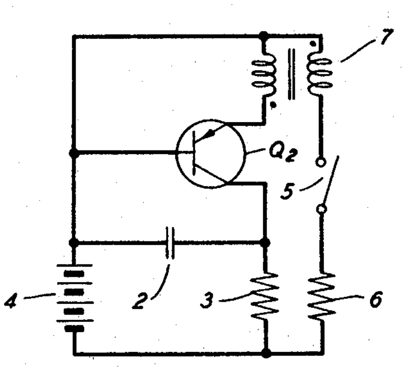
Figure 5B:
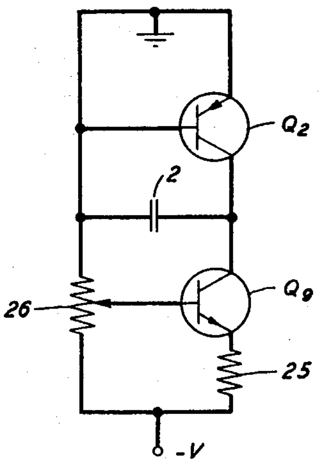

Typical waveforms as observed for $V_{ce}$ and $I_c$ for the circuit of FIG. 3 operating astably are shown in FIG. 4. The period T of the waveform can be easily varied from a fraction of a microsecond to several hundred milliseconds. The lower limit for the rise time, $t_r$, for a medium frequency transistor, is under $10^{-8}$ seconds. During the second breakdown transient, $dv/dt$ rates of $5\times10^9$ are realized. This rapid change in voltage can result in current pulses, as shown for $I_c$, in excess of 20 amperes in low power transistors.

If in the FIG. 3 circuit resistor 3 is 240K and a 17A transistor is used with capacitor 2 as the collector-to-base internal capacitance, a rise time $t_r$ of 15 nanoseconds with a change of 60 volts in $V_{ce}$ can be realized. For this transistor, $E_T\approx1.0$ milliwatt-second.

If a monostable mode of operation is desired, then for a given power supply, values of resistor 3 larger than the maximum bound for astable operation must be chosen. The larger value of resistance results in a static voltage $V_{ce}$ too small to initiate SB. FIG. *5a* depicts one such circuit in accordance with the invention for SB monostable operation of a transistor Q2. The capacitor 2, resistor 3 and source 4 are disposed as in the FIG. 3 astable circuit. Additionally, however, a trigger circuit including a resistor 6 and an inductive coupling 7 connects source 4 with the emitter of transistor Q2; and switch 5 is located in this trigger circuit.

With switch 5 open, the monostable circuit will repose in a quiescent state somewhere in its normal operating region, for example. Closure of switch 5 will cause a current pulse to be inductively coupled to the emitter lead of the transistor Q2 which in turn will result in an energy dissipation high enough to initiate SB. Again, the energy stored in capacitor 2 is discharged through the emitter and collector electrodes, and the circuit will return to its quiescent state.

Obviously the external trigger represented in the monostable circuit of FIG. *5a* as switch 5, can be any electrical or mechanical switch. The $V_{ce}$ drop and current pulses generated by the astable and monostable variants of the invention are usefully employed as gating or switching pulses in synchronous circuits or as pulse regenerators, for example.

The monostable operation is based on the fact that the continuous energy dissipation in a normally "off" transistor can be controlled by the voltage across it and the leakage current conducted. One way of adjusting this quiescent energy dissipation was just described. Another way is shown in FIG. *5b*, which overcomes problems associated with power supply size and resistor values. In the circuit of FIG. *5b*, SB– operating transistor Q2 with its charging capacitor 2 are functionally the same as the like-numbered components in FIG. *5a*. Replacing the source 4 and load resistor 3, however, is a circuit including a voltage source −V, a driver transistor designated Q9, an emitter circuit resistor 25 and a potentiometer 26 for adjusting the base bias. This circuit acts as a constant current sink to supply energization pursuant to the invention to SB– operating transistor Q2. Accordingly, the sensitivity of a monostable circuit or the frequency of an astable circuit devised as per FIG. *5b* in accordance with the present teachings can be controlled simply by adjusting the tap on potentiometer 26.

In the astable circuit, the repetition rate of the FIG. 4 waveform is a function of the time constant RC of capacitor 2 and resistor 3. Both parameters can be varied within the bounds defined above. A change in the ohmic value of resistor 3 has no effect on the $V_{ce}$ rise time, $t_r$. The effect on $t_r$ of a change in capacitor 2, is minimal until the change is quite large. Again, capacitor 2 frequently can be the internal capacitance of the transistor.

FIG. 6 shows a circuit pursuant to the invention where either voltage or currnet pulses can be phased from one accurate master trigger circuit. Transistor Q3 is connected as described above for astable operation with an emitter-to-base short and a serially connected driving circuit including a capacitor 8, a resistor 10, and a source 4, with capacitor 8 connected across the collector and base leads. Transistor Q4 is connected with its base-to-collector circuit containing a capacitor 9. The base and emitter of transistor Q3 are common to the base of transistor Q4. An inductive coupling 12 is disposed between the emitter circuit of transistor Q4 and the collector circuit of transistor Q3. Voltage feedback thus is provided from the astably operating transistor Q3 to transistor Q4. Capacitor 9 is connected between the collector and base leads of transistor Q3 to serve as an energy source to provide current pulses necessary to trigger Q4. Resistor 11 is connected between the collector lead and the common juncture of resistor 10 and capacitor 8, to serve as a charge path for capacitor 9 and consequently to control the frequency at which transistor Q4 enters the SB mode.

Figure 6A:
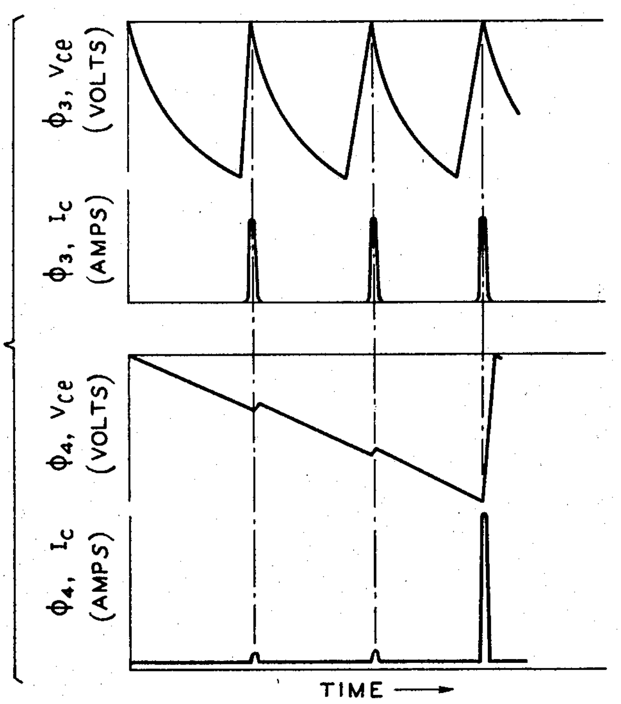

Operation of the circuit is based on the relation that $R_{11}C_9 > R_{10}C_8$. Transistor Q3, resistor 10 and capacitor 8 comprise an astable circuit used to trigger transistor Q4. FIG. 6*a* depicts typical waveforms reflecting the circuit's operation.

Two aspects of the FIG. 6 circuit are significant. First, it is noted that the sensitivity of the emitter lead to a trigger is high as compared to that of the collector lead of transistor Q3. Secondly, the energy pulses provided from transistor Q3 overcome the slow and normally inaccurate RC charging of voltage across the astably operating transistor as, for example, that of FIG. 3.

For wide variations in the values of resistor 11 and capacitor 9, astably operating transistor Q3 will oscillate at a frequency which is an integral multiple of the frequency at which the triggered transistor Q4 enters its second breakdown mode. Although only one triggered transistor is shown, it is possible for one astable circuit to drive several output stages.

FIG. 7 depicts a transistor magnetic core driver circuit employing SB in accordance with the invention. Transistors Q5 and Q6 are operating astably with a turn from their collectors wound in opposite directions around core 19. The SB current pulses generate magnetic fields for ferrite core switching. Two transistors are used so that one generates set pulses while the other provides reset. Therefore, it is possible to observe a continuous signal at $V_s$.

Resistors 17 and 18 are used as current limiters and to spread the width of the current pulses derived from the collectors and conducted during the SB transient. These collector currents, for the component values given below, are approximately 4 amperes in magnitude with a 2 μsec. duration. A pulse repetition rate with a period of 12 milliseconds was obtained, with a maximum voltage, $V_s$, of 9 volts.

| | |
|---|---|
| R15 | 40K |
| R16 | 160K |
| C13 | 15μf |
| C14 | .25μf |
| R17 | 6Ω |
| R18 | 5Ω |

The circuit shown in FIG. 8 operates in the same manner essentially as described for the circuit of FIG. 6. The only difference is that the pulse transformer 12 has been replaced by a hand wound core 22. This circuit demonstrates the ease with which the inductive coupling can be provided.

In summary, a basic principle is h erein disclosed for the successful nondestructive continuous operation of transistors in their region of second breakdown, and several illustrative circuits are shown which apply the inventive concepts. Many obvious modifications and changes can be devised by persons skilled in the art along with many further obvious applications. It is expressly understood that all such modifications, changes and extensions of the invention are within the ambit of the claims to follow.

What is claimed is:

1. An oscillator circuit comprising a first transistor having base, collector and emitter electrodes, said first transistor exhibiting an energy dissipation threshold level in the second breakdown region below which continuous operation is non-destructive; a capacitor connected across said base and collector electrodes, said capacitor having a charge storage capacity insufficient to cause said threshold energy dissipation level to be exceeded when said capacitor is discharged through said emitter and collector leads; a common shorting path from ground connecting said emitter and base electrodes of said first transistor; and a charging circuit for said capacitor comprising a second transistor having base, collector and emitter electrodes, a voltage source connected across said last-named base and emitter electrodes, a fixed resistance connected between said emitter electrode and said source, a potentiometer in the base electrode leg of said charging circuit for selectively varying the collector-to-base current of said second transistor, and connections across said capacitor between said potentiometer and said second transistor collector electrode; whereby when said first transistor is operated into its second breakdown region as an astable oscillator the frequency thereof is controlled through said potentiometer.

2. A magnetic core driving circuit comprising first and second transistors each having base, collector and emitter electrodes, said first and second transistors each exhibiting an energy dissipation threshold level in the second breakdown region below which continuous operation is nondestructive; first and second capacitors connected respectively across said base and collector electrodes of said first and second transistors through first and second loops; a magnetic core including sensing means, said first and second loops being wound around said core in opposite directions; a voltage source; means connecting said source between said first capacitor and the collector electrode of said first transistor; means connecting said source between said second capacitor and the collector electrode of said second transistor; means including a current-limiting resistive element connecting the emitter and base electrodes of each respective said transistor, said resistive elements also spreading the width of current pulses derived from said collector electrodes during a second breakdown transient; said capacitors charging sufficiently from said source to drive said first and second transistors into second breakdown but not sufficiently to cause said energy dissipation threshold levels thereof to be exceeded; and means for phasing the resulting second breakdown transient current pulses so that said first transistor generates set pulses and said second transistor generates reset pulses.

3. A method for continuously operating a given transistor in its region of second breakdown, said transistor consisting of base, collector and emitter electrodes and being connected in the common emitter configuration, said method comprising the steps of measuring the minimum energy dissipation $E_M$ necessary in said transistor to initiate second breakdown, measuring the minimum energy dissipation $E_T$ in said transistor that will result in irreversible thermal damage thereto; and operating the transistor in a circuit such that the actual energy dissipation $E_A$ in said transistor satisfies the relation $E_M < E_A \leq E_T$.

4. The method claimed in claim 3 preceded by the step of connecting said base and emitter electrodes directly together in said circuit.

5. A triggering circuit comprising a first transistor including first base, collector and emitter electrodes, said first transistor exhibiting a threshold energy dissipation level in the second breakdown region below which continuous operation is nondestructive a shorting circuit connecting said first base and emitter electrodes a first capacitor connected across said first base and collector electrodes, said first capacitor having a charge storage capacity insufficient to cause said threshold level to be exceeded when said first capacitor is discharged through said first emitter and collector leads a second transistor including second base collector and emitter electrodes and exhibiting a like threshold energy dissipation level as said first transistor means connecting the base and emitter electrodes of said first transistor with the base electrode of said second transistor a second capacitor connected across said second base and collector electrodes an inductive coupling disposed between the collector-to-base circuit of said first transistor and the emitter-to-base circuit of said second transistor a voltage source a first resistor a second resistor said first resistor and said source forming a closed charging loop for said first capacitor said first and second resistor and said source forming a closed charging loop for said second capacitor the values of said first and second capacitors and said first and second resistors being chosen so that $R_1C_1 < R_2C_2$ said first transistor, said first capacitor and said first resistor comprising an astable circuit for generating triggering pulses to said second transistor through said inductive coupling, whereby said first transistor oscillates at a frequency which is an integral multiple of the frequency at which said second transistor enters its second breakdown mode.

References Cited

UNITED STATES PATENTS

| | | | |
|---|---|---|---|
| 2,801,340 | 7/1957 | Keonjian et al. | 307—88.5 |
| 3,114,114 | 12/1963 | Atherton et al. | 331—111 |

OTHER REFERENCES

Electronic Design, vol. II, No. 17, Aug. 16, 1963, p. 8.

H. A. Schafft et al.: "Breakdown Characteristics of Semiconductor Materials," Electro-Technology, June 1965, pp. 77–82.

H. A. Schafft et al.: "Second Breakdown in Transistors," IRE Transactions on Electron Devices, March 1962, pp. 129–136.

R. J. Vilmur et al.: "Avalanching Transistor Generates Microwaves," Electronics, Oct. 25, 1963, pp. 35–36.

ROY LAKE, *Primary Examiner.*

S. H. GRIMM, *Assistant Examiner.*